US012682490B2

(12) United States Patent
Barsopia et al.

(10) Patent No.: US 12,682,490 B2
(45) Date of Patent: Jul. 14, 2026

(54) INFORMATION PROCESSING DEVICE, METHOD AND MEDIUM

(71) Applicant: Rakuten Group, Inc., Tokyo (JP)

(72) Inventors: Vivek Barsopia, Tokyo (JP); Menandro Roxas, Tokyo (JP); Mitsuru Nakazawa, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 282 days.

(21) Appl. No.: 18/519,850

(22) Filed: Nov. 27, 2023

(65) Prior Publication Data

US 2024/0212207 A1 Jun. 27, 2024

(30) Foreign Application Priority Data

Dec. 23, 2022 (JP) ................................. 2022-207151

(51) Int. Cl.
*G06T 7/73* (2017.01)

(52) U.S. Cl.
CPC ...... *G06T 7/74* (2017.01); *G06T 2207/20081* (2013.01); *G06T 2207/20084* (2013.01); *G06T 2207/30164* (2013.01); *G06T 2207/30204* (2013.01)

(58) Field of Classification Search
CPC ............. G06T 7/74; G06T 2207/20081; G06T 2207/20084
USPC ........................................................ 382/103
See application file for complete search history.

(56) References Cited

U.S. PATENT DOCUMENTS

| | | | |
|---|---|---|---|
| 2021/0104033 A1* | 4/2021 | Imagawa | G06T 7/74 |
| 2023/0386182 A1* | 11/2023 | Kitagawa | G06V 10/761 |

FOREIGN PATENT DOCUMENTS

| | | |
|---|---|---|
| JP | 2020-186925 A | 11/2020 |
| WO | 2022/102522 A1 | 5/2022 |

OTHER PUBLICATIONS

NPL: Results Publication Date Range: Feb. 5, 2009 to Oct. 17, 2025.*
NPL: InnovationQ+ by IP.com and IEEE: Results Publication Date Range: Aug. 3, 2016 to Feb. 10, 2026.*

* cited by examiner

*Primary Examiner* — Quang N Vo
(74) *Attorney, Agent, or Firm* — Sughrue Mion, PLLC

(57) ABSTRACT

An information processing device 1 includes: a feature area detection unit 28 that acquires, by inputting a target image showing a fastening part that is an inspected target to a machine learning model, a feature area based on an estimated coordinate that includes a feature point relating to reference indication added to the fastening part and relates to a position of the feature point and a distribution of the estimated coordinate; an uncertainty evaluation unit 29 that determines whether the feature area satisfies a prescribed reference; and a fastening state determination unit 30 that determines a fastening state of the fastening part based on the estimated coordinate when the feature area satisfies the prescribed reference.

15 Claims, 10 Drawing Sheets

INFORMATION PROCESSING DEVICE, METHOD AND MEDIUM

CROSS-REFERENCE TO RELATED APPLICATION(S)

This application claims priority to and the benefit of Japanese Patent Application No. 2022-207151, filed on Dec. 23, 2022, the disclosure of which is expressly incorporated herein by reference in its entirety for any purpose.

FIELD

The present disclosure relates to a technology to inspect fastening parts.

BACKGROUND

Conventionally, a technology to analyze a target image to specify the angle between the position of a mark added on a high-tensile bolt, a washer, or a plate member and the position of the mark added on a nut has been proposed (see Japanese Patent Application Laid-open No. 2020-186925).

SUMMARY

In recent years, digital transformation (DX) for the inspection of fastening parts constituting structures such as steel towers has been promoted, and various technologies to assist the inspection of fastening parts have been proposed. The conventionally-proposed technologies produce some effects in realizing a reduction in labor to inspect fastening parts and an increase in inspection accuracy, but have room for an improvement in considering fluctuations in marker position detection accuracy caused by the manual addition of markers having a certain thickness or the like.

In view of the above problems, the present disclosure has an object of realizing a reduction in labor to inspect fastening parts and an increase in inspection accuracy with consideration given to fluctuations in marker position detection accuracy.

An example of the present disclosure provides an information processing device including: feature area detection means for acquiring, by inputting a target image showing a fastening part that is an inspected target to a machine learning model, a feature area based on an estimated coordinate that includes a feature point relating to reference indication added to the fastening part and relates to a position of the feature point and a distribution of the estimated coordinate; uncertainty evaluation means for determining whether the feature area satisfies a prescribed reference; and fastening state determination means for determining a fastening state of the fastening part based on the estimated coordinate when the feature area satisfies the prescribed reference.

The present disclosure may be grasped as an information processing device, an information processing system, an information processing method performed by a computer, or an information processing program performed by a computer. Further, the present disclosure may also be grasped as a recording medium readable by a computer or other devices, a machine, or the like on which such a program is recorded. Here, the recording medium readable by a computer or the like refers to a recording medium that stores information such as data and a program by an electrical, magnetic, optical, mechanical, or chemical operation and is capable of reading the same from a computer or the like.

According to the present disclosure, it is possible to realize a reduction in labor to inspect fastening parts and an increase in inspection accuracy with consideration given to fluctuations in marker position detection accuracy.

DESCRIPTION OF EMBODIMENTS

Hereinafter, an embodiment of an information processing device, an information processing method, and an information processing program according to the present disclosure will be described based on the drawings. However, the following embodiment is given only for illustration, and does not intend to limit the information processing device, the information processing method, and the information processing program according to the present disclosure to the following specific configurations. In implementation, specific configurations corresponding to the embodiment may be appropriately employed, and various modifications or deformations may be performed.

In the present embodiment, a case in which a technology according to the present disclosure is implemented for the inspection and management of fastening parts constituting structures such as steel towers will be described. However, the technology according to the present disclosure is widely usable for the inspection and management of fastening parts, and the application targets of the present disclosure are not limited to examples shown in the embodiment.

In recent years, digital transformation (DX) for the inspection of fastening parts constituting structures such as steel towers has been promoted. In the DX, an inspection technology taking advantage of the imaging processing and image analysis of fastening parts has been proposed as an example. In the inspection technology, the effect of reducing labor and burden on manual operations required for the inspection of fastening parts and the simple and easy realization of discrimination and abnormality detection for each of the fastening parts are expected. However, the conventionally-proposed technology has a problem in that a difficulty in determining a marker position due to, for example, the manual addition of a marker having a certain thickness or the like has to be taken into consideration, and also has a problem in increasing the efficiency of learning data set construction that possibly causes a bottleneck in performing specification using a machine learning model.

In view of the above circumstances, the information processing device, the information processing method, and the information processing program according to the present embodiment make it possible to consider a difficulty in determining a reference indicating position and increase the efficiency of learning data set construction that possibly causes a bottleneck in performing specification using a machine learning model.

<Configuration of Fastening Part>

Figure 1:
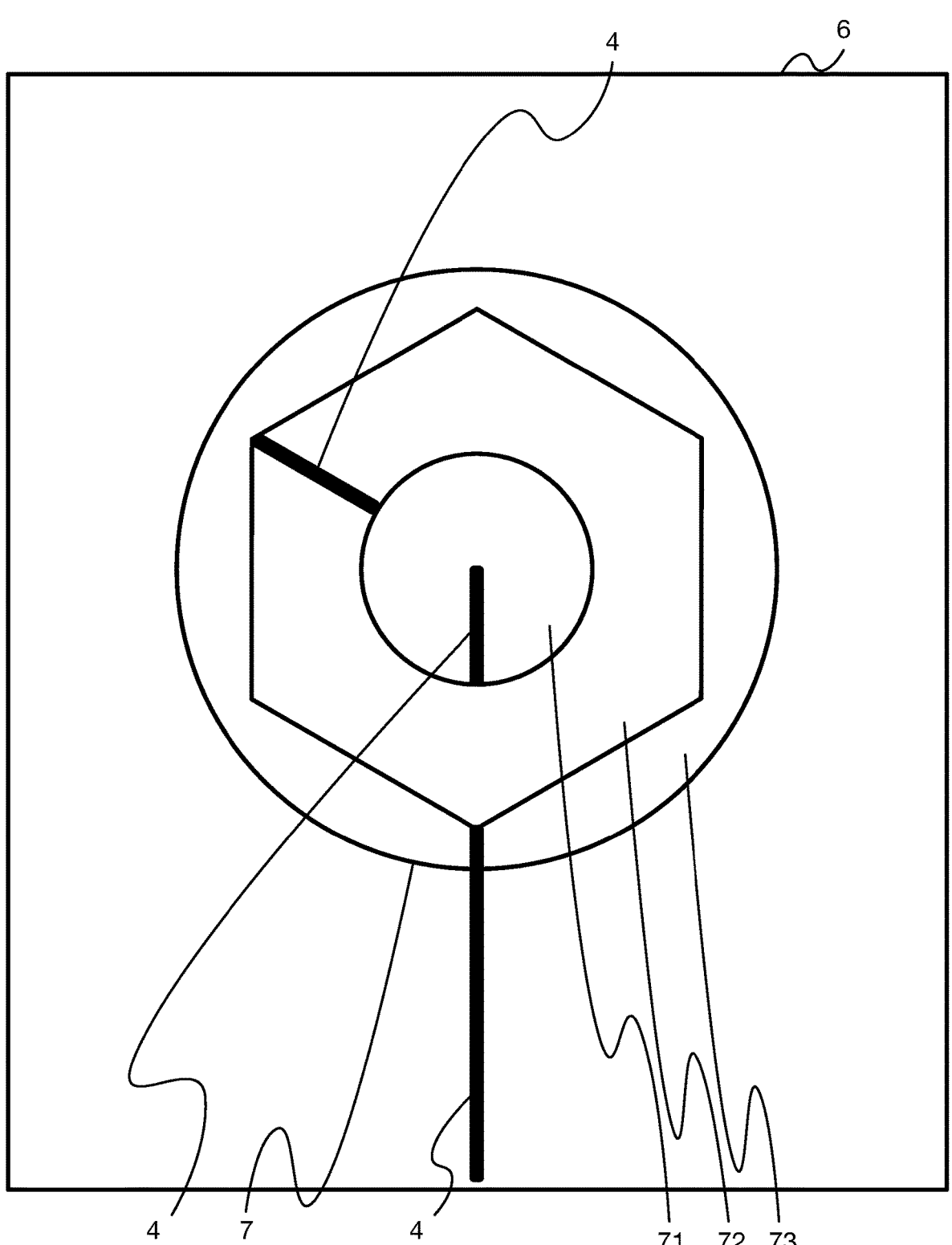
FIG. 1 is a plan diagram of a fastening part in a properly-fastened state according to an embodiment.
Figure 2:
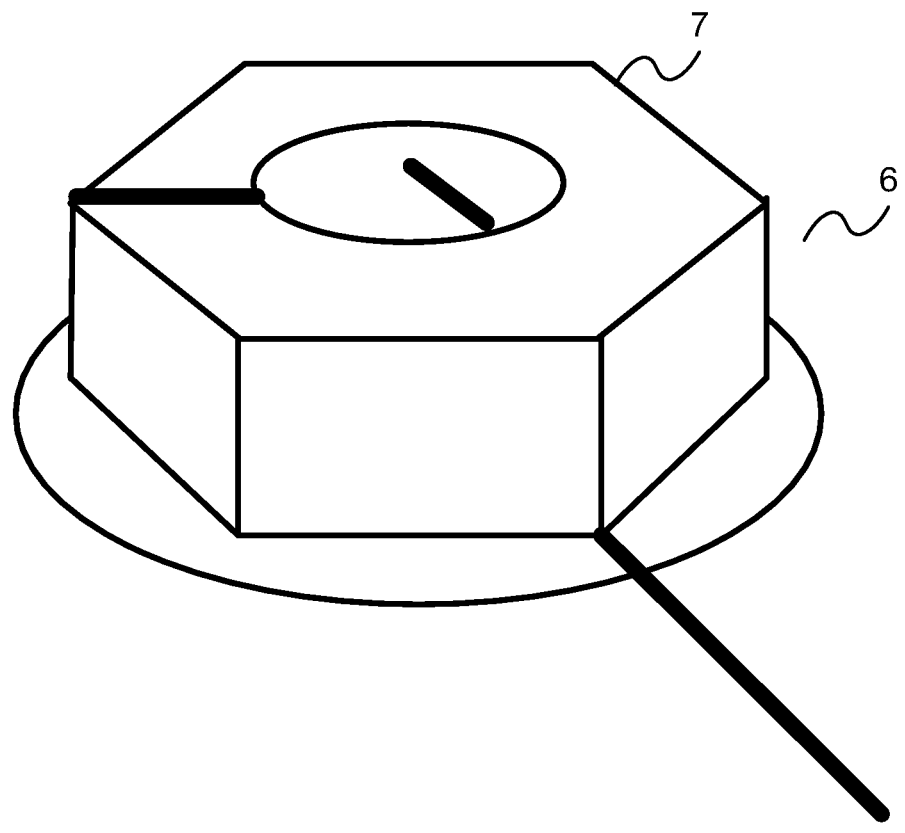
FIG. 2 is a perspective diagram of the fastening part in the properly-fastened state according to the embodiment.

FIGS. 1 and 2 are, respectively, a plan diagram and a perspective diagram of a fastening part in a properly-fastened state according to the present embodiment. The fastening part has a fastening material 7 and a fastened target 6 that are screw-fastened. In the present embodiment, an example in which a bolt 71, a nut 72, and a washer 73 are used as the fastening material 7 for screw fastening will be described. However, a fastening material to which the technology according to the present disclosure is applicable is not limited to the illustration in the present disclosure. For example, a fastening material that uses a bolt and a nut but does not use a washer is also usable as the fastening material to which the technology according to the present disclosure is applicable. Further, a screw that does not use a nut and a washer is also usable as the fastening material to which the technology according to the present disclosure is applicable.

Further, in the present embodiment, reference indication is added to the fastening material 7 and the fastened target 6. As will be described in detail later in a fastening procedure, a marker line 4 (matchmark) is employed as reference indication in the present embodiment. In a state in which primary fastening is completed, the marker line 4 showing one straight line that passes through all the bolt 71, the nut 72, the washer 73, and the fastened target 6 toward the outside from the center of the screw threads of the bolt 71 is written. Then, the positional relationship between the marker line 4 on the fastening material 7 and the marker line 4 on the fastened target 6 changes when secondary fastening is performed. In the present embodiment, a plurality of feature points relating to reference indication thus added are detected from a target image for inspection, and the construction state of a fastening part is determined based on the detected feature points.

Note that an example in which reference indication is written by a pen or the like is described in the present embodiment. However, specific means employable to add reference indication to a fastening part is not limited to the illustration in the present embodiment. As the specific means employable to add reference indication, various means such as pasting a medium to which reference indication is added to a fastening part through an adhesive or gluing agent, directly coating or printing reference indication on a fastening part, directly engraving (laser engraving or the like) or baking reference indication on a fastening part, embedding a medium to which reference indication is added in a fixed part, and mechanically connecting a medium to which reference indication is added to a fastening part are employable.

<Fastening Procedure>

Figure 3:
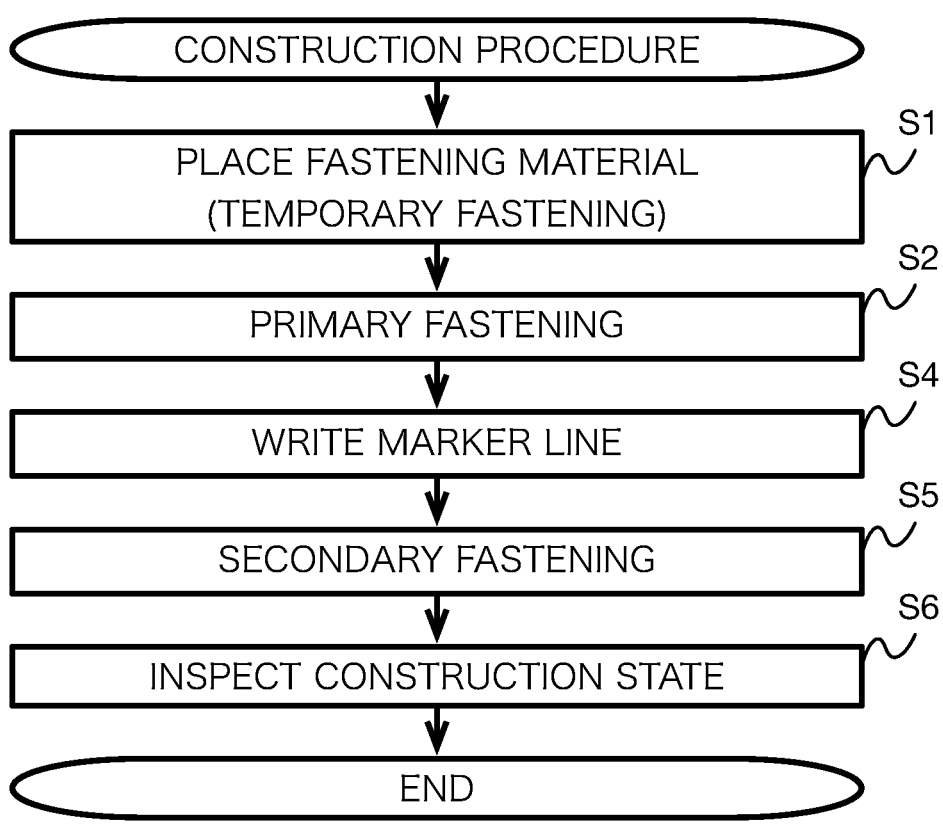
FIG. 3 is a flowchart showing a fastening procedure according to the embodiment.

FIG. 3 is a flowchart showing a fastening procedure according to the present embodiment. Note that a fastening procedure for fastening the fastened target 6 with the bolt 71, the nut 72, and the washer 73 as the fastening material 7 will be described in the present embodiment. However, fastening with other fastening materials for screw fastening is also substantially the same except that some procedures can be appropriately changed according to the types of the fastening materials.

An operator places the fastening material 7 on the fastened target 6 and temporarily fastens the same (step S1), and performs primary fastening with a primary torque set according to the standard of the fastening material 7 (step S2).

Then, the operator performs marking for reference indication on the bolt 71, the nut 72, the washer 73, and the fastened target 6 in a primarily-fastened state (step S4). The reference indication is indication for visualizing a relative angle in the rotation of the bolt 71, the nut 72, the washer 73, and the fastened target 6. Generally, in a state in which the primary fastening is completed, the marker line 4 showing one straight line that passes through all the bolt 71, the nut 72, the washer 73, and the fastened target 6 toward the outside from the center of the screw threads of the bolt 71 is written with a pen or the like.

After completing the writing of the marker line 4, the operator performs secondary fastening (full fastening) (step S5). Specifically, the operator performs secondary fastening on the nut 72 so that the angle of the nut 72 with respect to the bolt 71, the washer 73, and the fastened target 6 that are in a primarily-fastened state becomes a prescribed angle (for example, 120 degrees) in the fastening rotation direction of the nut 72. That is, the reference indication in the present disclosure is one that is added to the fastening material 7 and the fastened target 6 after the primary fastening, and that shows a change in the positional relationship between the reference indication on the fastening material 7 and the reference indication on the fastened target 6 when the secondary fastening is performed. Therefore, the reference indication may only be one that shows a change in the positional relationship before and after the secondary fastening when the reference indication is added after the primary fastening and before the secondary fastening, and that enables the calculation of a rotation angle in the secondary fastening. The specific indication mode of the reference indication is not limited.

After the secondary fastening, a fastening state is inspected based on a captured image obtained by capturing an image of the fastening part (step S6). In a state in which the secondary fastening is properly completed, an angle (hereinafter called a "marker angle") formed by the marker line 4 added to the bolt 71, the washer 73, and the fastened target 6 and the marker line 4 added to the nut 72 falls within the range of a positive prescribed angle in the fastening rotation direction of the nut 72 (see FIG. 1). Therefore, in the inspection of the fastening state, the marker angle is calculated based on the captured image obtained by capturing the image of the fastening part, and a determination is made as to whether the calculated marker angle falls within the prescribed range in the fastening rotation direction of the nut 72. The details of inspection processing will be described later using a flowchart.

<Configuration of System>

Figure 4:
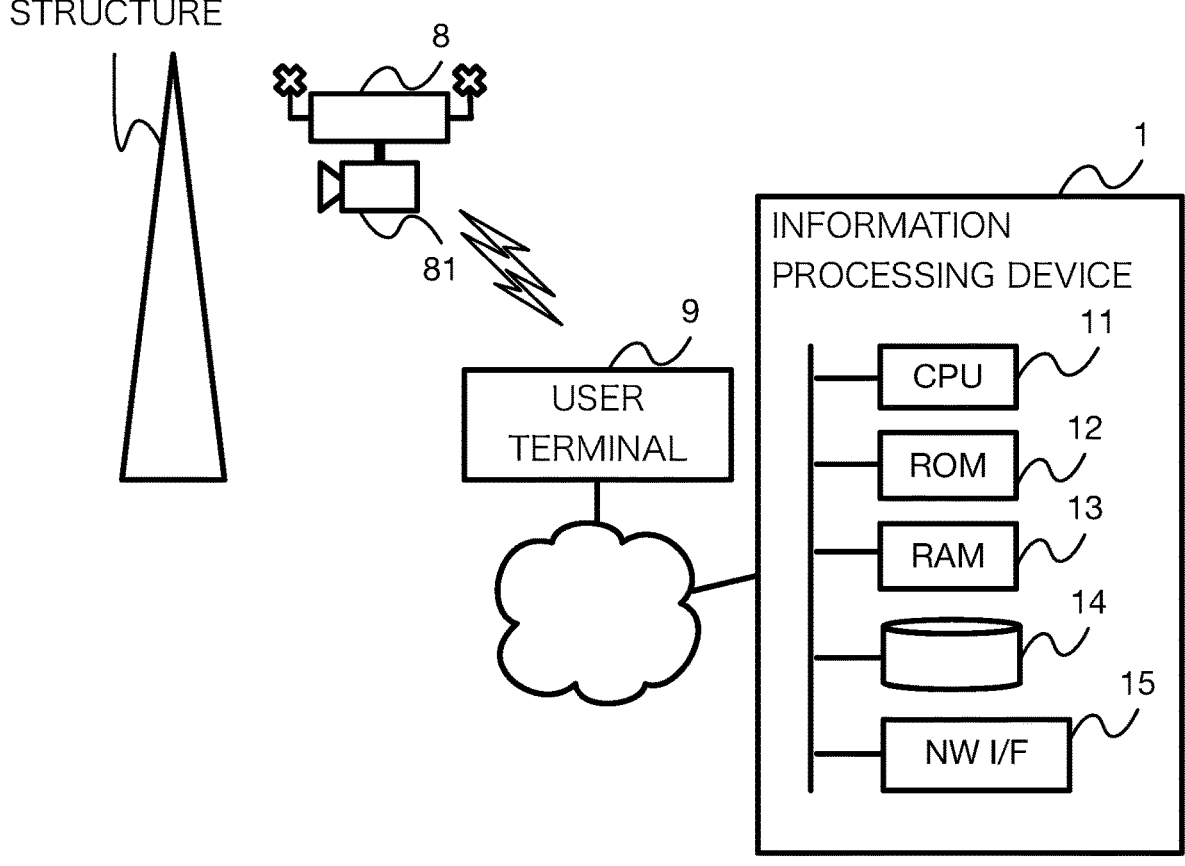
FIG. 4 is a schematic diagram showing the configuration of a system according to the embodiment.

FIG. 4 is a schematic diagram showing the configuration of a system according to the present embodiment. The system according to the present embodiment includes an information processing device 1, a drone 8, and a user terminal 9 that are communicable with each other by being connected to a network.

The information processing device 1 is a computer including a CPU (Central Processing Unit) 11, a ROM (Read Only Memory) 12, a RAM (Random Access Memory) 13, a storage device 14 such as an EEPROM (Electrically Erasable and Programmable Read Only Memory), and a HDD (Hard Disk Drive), a communication unit 15 such as a NIC (Network Interface Card), or the like. However, as for the specific hardware configuration of the information processing device 1, omission, replacement, and addition are appropriately possible according to the embodiment. Further, the information processing device 1 is not limited to a device composed of a single housing. The information processing device 1 may be realized by a plurality of devices using the technology of so-called cloud or distributed computing or the like.

The drone 8 is a small unmanned aircraft of which the flight is controlled according to an input signal from the outside and/or a program recorded on a device, and includes a propeller, a motor, a CPU, a ROM, a RAM, a storage device, a communication unit, an input device, an output device, or the like (not shown). However, as for the specific hardware configuration of the drone 8, omission, replacement, and addition are appropriately possible according to the embodiment. Further, the drone 8 according to the present embodiment includes an imaging device 81, and captures an image of a fastening part according to an input signal from the outside and/or a program recorded on the device when flying around a target structure.

The user terminal 9 is a terminal device used by a user. The user terminal 9 is a computer including a CPU, a ROM, a RAM, a storage device, a communication unit, an input device, an output device, or the like (not shown). However, as for the specific hardware configuration of the user terminal 9, omission, replacement, and addition are appropriately possible according to the embodiment. Further, the user terminal 9 is not limited to a device composed of a single housing. The user terminal 9 may be realized by a plurality of devices using the technology of so-called cloud or distributed computing or the like. The user makes use of various services offered by the system according to the present embodiment via the user terminal 9.

Figure 5:
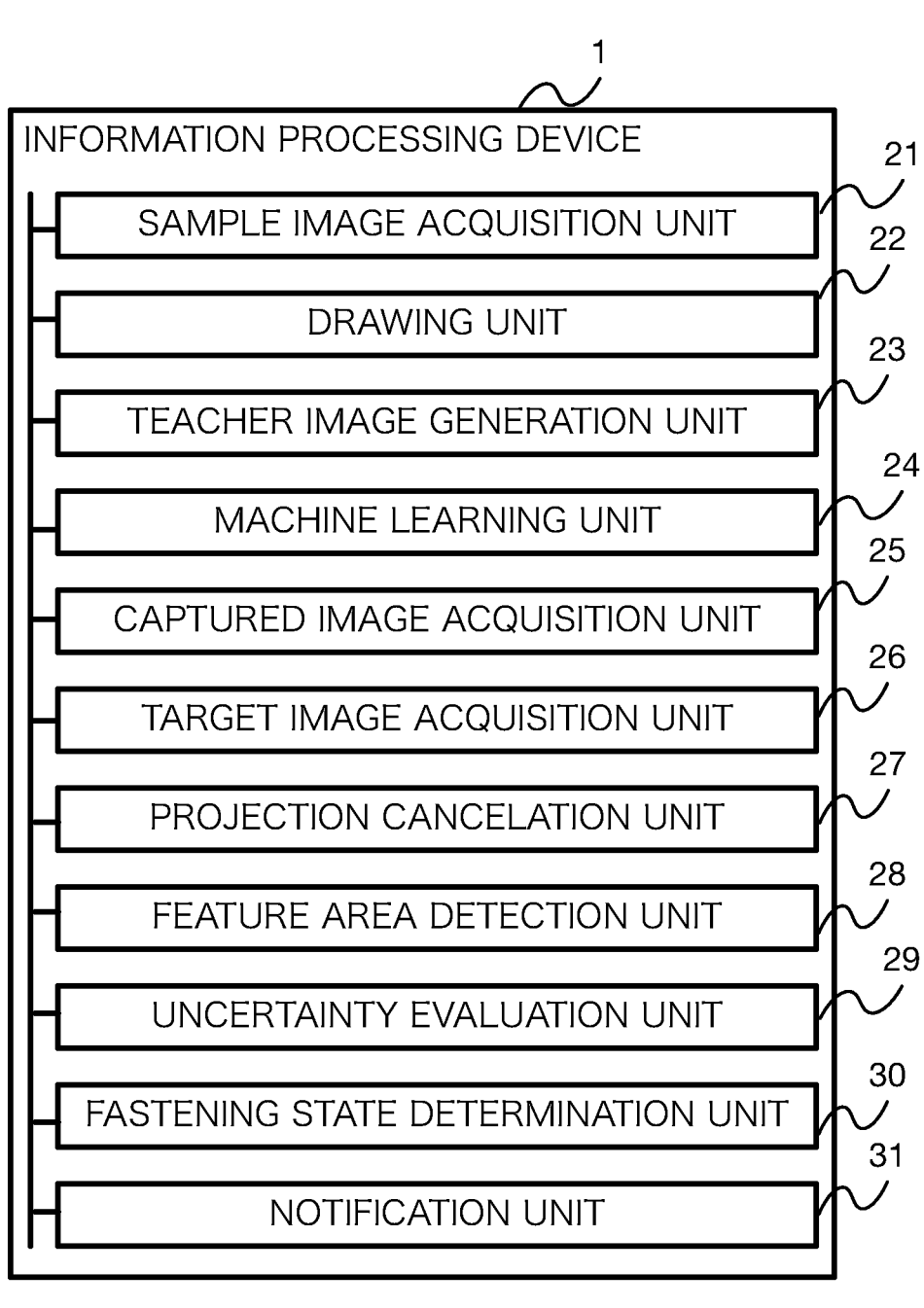
FIG. 5 is a diagram showing the outline of the function configuration of an information processing device according to the embodiment.

FIG. 5 is a diagram showing the outline of the function configuration of the information processing device 1 according to the present embodiment. When a program recorded on the storage device 14 is read by the RAM 13 and performed by the CPU 11 and respective hardware provided in the information processing device 1 is controlled, the information processing device 1 functions as an information processing device including a sample image acquisition unit 21, a drawing unit 22, a teacher image generation unit 23, a machine learning unit 24, a captured image acquisition unit 25, a target image acquisition unit 26, a projection cancellation unit 27, a feature area detection unit 28, an uncertainty evaluation unit 29, a fastening state determination unit 30, and a notification unit 31. Note that the respective functions provided in the information processing device 1 are performed by the CPU 11 serving as a general-purpose processor in the present embodiment and other embodiments that will be described later. However, some or all of these functions may be performed by one or a plurality of dedicated processors.

The sample image acquisition unit 21 acquires a sample image in which an image of a screw-fastened fastening part and reference indication added to the fastening part is captured. As the sample image, an image obtained by capturing an image of an actually-constructed fastening part is, for example, used. At this time, an image captured under various conditions is preferably prepared as the sample image so that various types of styles are obtained in style transfer that will be described later. The various conditions include, for example, the settings of a camera at image capturing, climate, sunshine, date and time, the presence or absence of lighting, the angle of the lighting, the color of the lighting, the material of the fastening part, the color of reference indication, the density of the reference indication, or the like.

The drawing unit 22 draws a two-dimensional image drawn based on the three-dimensional model of a fastening part to which reference indication is added. The three-dimensional model used here may be a three-dimensional model modeled based on the design data or the like of the fastening part or a three-dimensional model acquired by three-dimensionally scanning the actually-constructed fastening part with a camera or the like with which depth information is obtained. In the present embodiment, the three-dimensional model includes information with which it is possible to specify the position of the included reference indication in the model, and the drawing unit 22 draws, based on position information on the reference indication included in the three-dimensional model, the two-dimensional image to which the annotation of coordinates showing the positions of a plurality of feature points in the two-dimensional image relating to the reference indication is added. However, the annotation added to the drawn two-dimensional image may not be limited to one based on the position information obtained from the three-dimensional model. For example, an annotation may be added by analyzing the drawn two-dimensional image, or may be manually added to the drawn two-dimensional image. The drawing unit 22 draws a plurality of two-dimensional images drawn from a plurality of viewpoints (camera positions at rendering) different from each other.

The teacher image generation unit 23 generates a teacher image having the structure of a two-dimensional image and the style of a sample image by performing style transfer (new style transfer, style transformation) in which the style extracted from the sample image is applied to the structure (content expression) extracted from the two-dimensional image. More specifically, the teacher image generation unit 23 causes a neural network to function as an extractor for extracting features relating to the structure (content expression) of a two-dimensional image, and generates a teacher image having the structure of the two-dimensional image and the style of a sample image by using an objective function with which an optimization problem for obtaining an adjusted image is solved in which both the loss of similarity in content expression from an original two-dimensional image and the loss of similarity in style expression from the sample image are minimized when performing various image adjustment on the two-dimensional image.

At this time, the teacher image generation unit 23 is enabled to obtain, by generating a teacher image in which annotation added to a two-dimensional image is succeeded, the teacher image to which the annotation of coordinates showing the positions of a plurality of feature points in the teacher image relating to reference indication is added. Then, the teacher image generation unit 23 generates, for each of the plurality of two-dimensional images, a plurality of teacher images each having a different style extracted from the sample image.

The machine learning unit 24 performs, using teacher data (learning data, training data, or a data set) in which coordinates (coordinates annotated in the teacher data) showing the positions of a plurality of feature points in the teacher image relating to reference indication added to a fastening part are labelled with respect to the teacher image in which a screw-fastened fastening part is captured, the learning processing of a machine learning model that outputs estimated coordinates showing the positions of a plurality of feature points in an image relating to the reference indication added to the fastening part and the distribution of the estimated coordinates with respect to the input of an image in which the fastening part is captured. In the present embodiment, an example in which standard deviations are used as the distribution will be described. However, a known statistical amount such as variance that shows fluctuations from an average value may be employed.

A standard deviation can be obtained together with a result estimated by a machine learning model by the addition of a node for outputting the standard deviation to the machine learning model. In the present embodiment, a convolutional neural network (CNN) is used as the machine learning model. Therefore, by the addition of a layer for outputting a standard deviation and a loss function for calculating the standard deviation for estimated coordinates to the convolutional neural network, the standard deviation of the estimated coordinates is obtained. Note that a function for calculating a standard deviation may be appropriately selected according to the embodiment and is not limited. The standard deviation output here shows that the uncertainty of the estimation result is lower as the value of the standard deviation is smaller (distribution is narrower), and is higher as the value of the standard deviation is larger (distribution is wider). Further, in the present embodiment, the estimated coordinates are two-dimensional coordinates specified by positions on an x-axis and a y-axis. Therefore, the standard deviation of the estimated coordinates is also output for each of the two axes (x-axis and y-axis) constituting the two-dimensional coordinates. The machine learning model may output estimated coordinates relating to feature points and the standard deviations of the estimated coordinates, output feature areas based on the estimated coordinates relating to the feature points and the standard deviations of the estimated coordinates, and output a map (such as a feature map, an intermediate map, a heat map, and a parameter map) showing whether respective pixels constituting an image input to the machine learning model correspond to the feature areas.

The captured image acquisition unit 25 acquires, as an inspected target, a captured image in which the fastening material 7 fastened to the fastened target 6 and the fastened target 6 are simultaneously captured. A method for acquiring the captured image is not limited. However, in the present embodiment, an example in which a captured image captured by the drone 8 with the imaging device 81 is acquired via the user terminal 9 will be described.

The target image acquisition unit 26 acquire a target image by specifying a portion of a captured image in which a fastening part is captured and cutting out the portion in which the fastening part is captured from the captured image. The target image acquisition unit 26 is enabled to detect the captured portion of the fastening part in the captured image by detecting the fastening part or prescribed features relating to reference indication in the captured image. As the prescribed features, it is possible to use the various features such as the shape of the fastening part, the shape of the reference indication, the color of the fastening part, and the color of the reference indication. At this time, the color tone of the reference indication is made different from those of the fastened target 6 and the fastening material 7 (for example, the reference indication is pink or red when the fastened target 6 and the fastening material 7 are gray), so that the captured portion of the fastening part may be easily detected. In this case, the target image acquisition unit 26 is enabled to detect the captured portion of the fastening part by detecting a prescribed color from the captured image. When the captured portion of the fastening part is specified, the target image acquisition unit 26 cuts out a prescribed range including the portion into a rectangular shape to acquire a target image. For the detection of a prescribed feature and/or the cutting-out of a target image, a machine learning model that has learned the feature of the fastening part may be used.

The projection cancelation unit 27 performs image transformation to cancel projection applied when a target image was captured by temporarily performing projection transformation of the target image into a plane image before processing by the feature area detection unit 28. Specific transformation processing may be appropriately selected according to circumstances such as a calculation amount. In order to correctly calculate a marker angle that will be described later, it is preferable to properly cancel projection on the surfaces of the fastening material 7 and the fastened target 6 to which reference indication is added. The marker line 4 written on each of the bolt 71, the nut 72, the washer 73, and the fastened target 6 is placed on different planes. Therefore, when inverse transformation for properly canceling projection on a target image is applied to the whole captured image and a marker angle is calculated based on the application of the inverse transformation, there is a possibility that the marker angle is incorrectly calculated. Therefore, when there is a possibility that the projection of the marker line 4 written on each of the fastening material 7 and the fastened target 6 is largely different (for example, a case in which a captured image captured at a close range is used or the like), it is preferable to extract respective planes relating to the marker line 4 and properly cancel the projection. However, when a difference in the projection of the marker line 4 written on each of the fastening material 7 and the fastened target 6 is relatively small (for example, a case in which a captured image captured at a long range is used or the like), strict cancelation of the projection may be omitted by the setting of an angle range permitted based on an error by projection if the marker angle is permitted within the prescribed range.

Note that as a method for detecting the plane of the nut 72 to which a marker line is added, it is possible to employ a method in which three or more apexes of a polygonal shape (a hexagon in the case of a hexagonal nut) constituting the upper surface of the nut 72 is detected by image recognition and the plane of the nut 72 to which the marker line is added is defined based on the detected apexes. Here, when it is difficult to directly detect the apexes by the image recognition, it is also possible to detect the respective sides of the polygonal shape constituting the upper surface of the nut 72 and handle the intersections of the detected respective sides as the apexes.

The feature area detection unit 28 acquires, by inputting a target image in which a fastening part as an inspected target is captured to a machine learning model generated by the machine learning unit 24, feature areas based on estimated coordinates that include feature points in a target image relating to reference indication added to the fastening part and show the positions of the feature points and the distribution of the standard deviations or the like of the estimated coordinates. In the present embodiment, there are a plurality of feature points relating to reference indication and a plurality of feature areas. The feature area detection unit 28 is capable of acquiring the feature areas based on the machine learning model with which it is possible to detect the feature points and the feature areas of the feature points. Here, the estimated coordinates of the feature points are, for example, coordinate positions corresponding to average values in the feature areas. Note that when the machine learning model does not directly output feature areas, the feature area detection unit 28 may determine feature areas based on output estimated coordinates and the distribution of the standard deviations or the like of the estimated coordinates.

Figure 6:
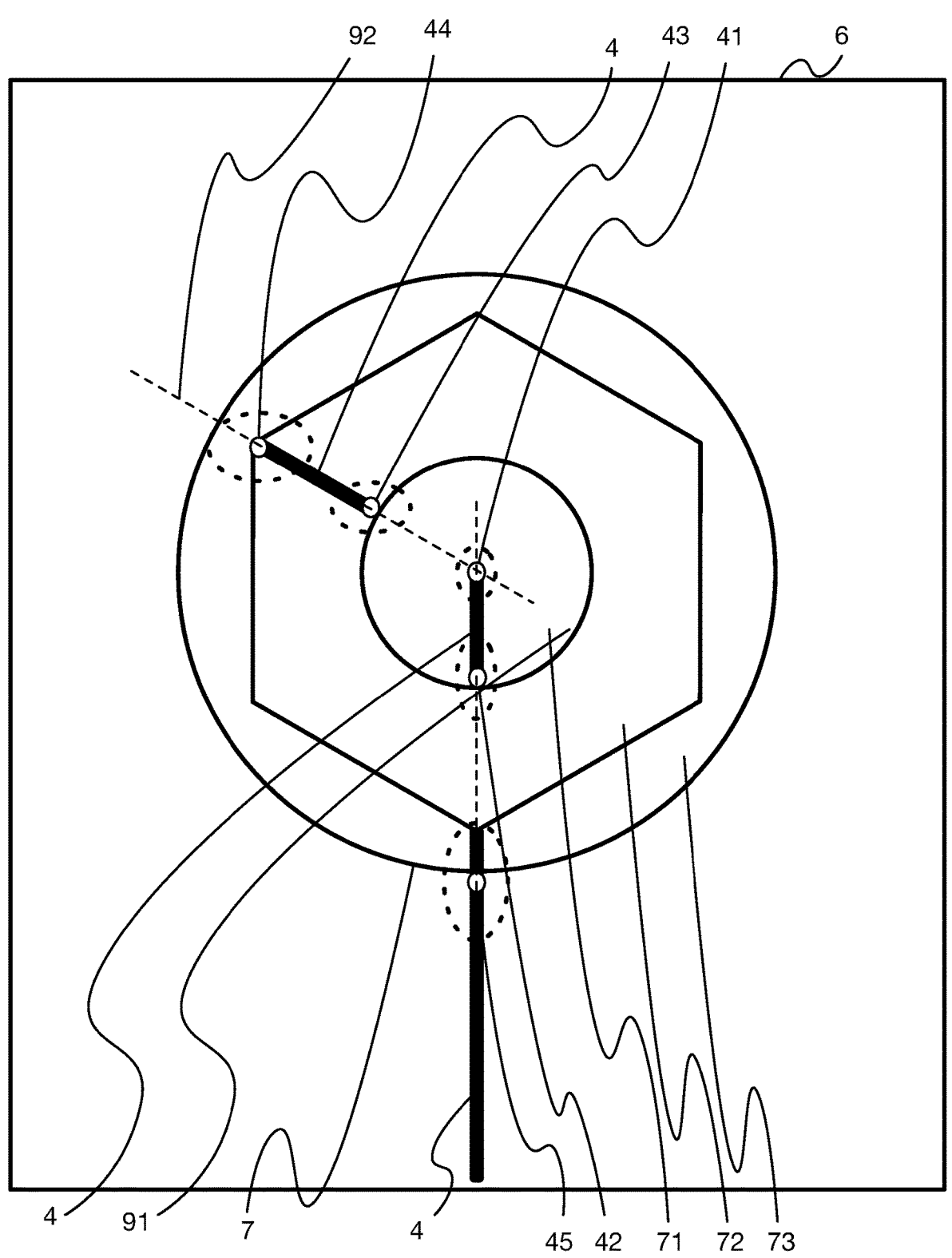
FIG. 6 is a diagram showing feature points detected from an image of the fastening part and feature areas (elliptic areas) based on standard deviations in the embodiment.

FIG. 6 is a diagram showing feature points detected from an image of a fastening part and feature areas (elliptic areas) based on standard deviations in the present embodiment. The plurality of feature points detected from the image of the fastening part include feature points relating to the shaft of the fastening material 7 (the shaft of the bolt 71) in the fastening part, reference indication on the fastening material 7, and the reference indication on the fastened target 6. More specifically, in the present embodiment, the plurality of feature points include a feature point 41 showing the fastening shaft (the shaft of screw fastening, the central point) of fastening in the fastening part, a feature point 42 showing the position of the reference indication (a mark end point on the bolt 71) at the outer edge of the tip end of the bolt 71, a feature point 43 showing the position of the reference indication (a mark start point on the nut 72) of the reference indication at the inner edge of the surface of the nut 72, a feature point 44 showing the position of the reference indication (a mark end point on the nut 72) at the outer edge of the surface of the nut 72, and a feature point 45 showing the position of the reference indication (a mark start point on a base part) on the fastened target 6. However, the feature points may only be detected for the number and positions of the feature points with which it is possible to determine a fastening state. The number and positions of the detected feature points are not limited to the illustration in the present embodiment.

The uncertainty evaluation unit 29 evaluates the uncertainty of an output result (estimation result) by determining whether feature areas based on estimated coordinates and distribution (such as standard deviations) output from a machine learning model satisfy a prescribed reference. In the present embodiment, the uncertainty evaluation unit 29 determines whether the sizes of ellipses including estimated coordinates (feature areas including pixels that may show reference indication) specified by standard deviations for each of two axes and including estimated coordinates satisfy a prescribed reference. In FIG. 6, feature areas (elliptic areas) corresponding to the respective feature points 41 to 45 are shown by dashed lines. Note that when diameters relating to the x-axis and the y-axis of the ellipses are compared with prescribed thresholds and both the diameters relating to the x-axis and the diameters relating to the y-axis are less than the prescribed thresholds, it is determined in the present embodiment that the sizes of the ellipses satisfy the prescribed reference. However, a scale used in the determination of the sizes is not limited to the disclosure in the present embodiment. For example, the areas of the ellipses (calculated areas or the number of pixels included in the ellipses) may be used to determine the sizes of the ellipses, or average values of the diameters may be used.

Further, the uncertainty evaluation unit 29 may determine that the prescribed reference is satisfied when the plurality of feature areas do not overlap each other, determine that the prescribed threshold is satisfied when the respective overlapping rates of the plurality of feature areas are less than prescribed thresholds, determine that the prescribed threshold is satisfied when no overlap does occur in combinations of specific feature areas, determine that the prescribed threshold is satisfied when the total of the sizes of the plurality of feature areas is less than a prescribed threshold, determine that the prescribed threshold is satisfied when the areas of the reference indication covered by the plurality of feature areas exceed a prescribed reference, and determine that the prescribed reference is satisfied when the widths or total of the feature areas in a direction orthogonal to the stretching direction of the reference indication at which the feature areas are positioned are less than a prescribed threshold. The uncertainty evaluation unit 29 may make a determination according to combinations of the one or more prescribed references. Here, the prescribed references may be changed according to the resolution of an image input to the machine learning model. Note that the case in which the feature areas are ellipses is described in the present embodiment. However, the shape of the feature areas is not particularly limited.

The fastening state determination unit 30 determines, when feature areas satisfy a prescribed reference (when it is evaluated that the uncertainty of estimated coordinates or feature areas of feature points is low), the fastening state of a fastening part based on the estimated coordinates of reference indication (the marker line 4 in the present embodiment). In the present embodiment, the fastening state determination unit 30 calculates, based on the estimated coordinates of a plurality of feature points relating to both the marker line 4 on the fastening material 7 and the marker line 4 on the fastened target 6 of which the positional relationship is changed by secondary fastening, a marker angle formed by the marker line 4 added to the bolt 71, the washer 73, and the fastened target 6 and the marker line 4 added to the nut 72, and determines the fastening state of the fastening part. Here, the fastening state of the fastening part shows whether the calculated marker angle falls within the range of a positive prescribed angle in the fastening rotation direction of the nut 72. When a determination result shows that the marker angle falls within the range of the positive prescribed angle (for example, 90 degrees to 150 degrees) in the fastening rotation direction of the nut 72, the fastening state determination unit 30 determines that the fastening part is properly fastened. On the other hand, when the determination result shows that the marker angle falls outside the range of the positive prescribed angle in the fastening rotation direction of the nut 72, the fastening state determination unit 30 determines that the fastening part is not properly fastened (imperfect fastening or looseness or the like with time occurs). Note that in the present embodiment, the fastening state determination unit 30 determines the fastening state of the fastening part as being "unsure" when the feature areas do not satisfy a prescribed reference.

In making a description with reference to FIG. 6, the fastening state determination unit 30 determines that the fastening part is properly fastened when an angle formed by a first approximate straight line 91 and a second approximate straight line 92 falls within the range of a prescribed angle. Here, the first approximate straight line 91 is an approximate straight line passing through the feature point 41 showing the central point in the fastening part, the feature point 42 showing the mark end point on the bolt 71, and the feature point 45 showing the mark start point on the base part, and the second approximate straight line 92 is an approximate straight line passing through the feature point 41 showing the central point, the feature point 43 showing the mark start point on the nut 72, and the feature point 44 showing the mark end point on the nut 72.

The notification unit 31 notifies the user of a result determined by the uncertainty evaluation unit 29 and a result determined by the fastening state determination unit 30.

<Flow of Processing>

Next, the flow of processing performed by the information processing device according to the present embodiment will be described. Note that the specific contents and processing procedure of the processing that will be described below show an example for carrying out the present disclosure. The specific processing contents and processing procedure may be appropriately selected according to the embodiment of the present disclosure.

Figure 7:
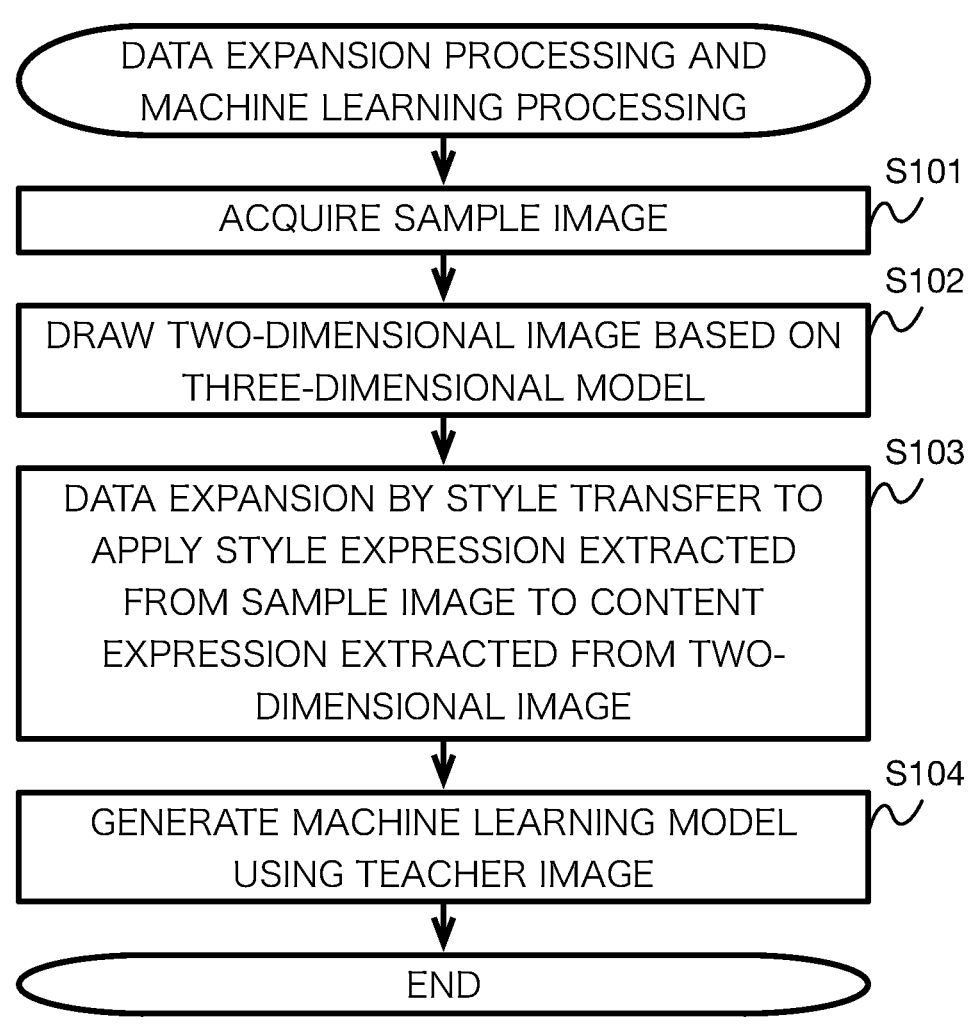
FIG. 7 is a flowchart showing the flow of data expansion processing and machine learning processing according to the embodiment.

FIG. 7 is a flowchart showing the flow of data expansion processing and machine learning processing according to the present embodiment. The processing shown in this flowchart is performed periodically or at a timing specified by a manager.

In steps S101 and S102, a sample image and a two-dimensional image used for data expansion using style transfer are acquired. The sample image acquisition unit 21 acquires a sample image in which a screw-fastened fastening part and reference indication added to the fastening part are captured (step S101). Further, the drawing unit 22 draws a two-dimensional image drawn based on the three-dimensional model of the fastening part to which the reference indication is added (step S102). After that, the processing proceeds to step S103.

In step S103, data expansion by style transfer is performed. The teacher image generation unit 23 generates, by performing style transfer to apply style expression extracted from the sample image to content expression extracted from the two-dimensional image, a teacher image having the content expression of the two-dimensional image and the style expression of the sample image. After that, the processing proceeds to step S104.

In step S104, a machine learning model is generated. The machine learning unit 24 generates a machine learning model using teacher data in which the teacher image is an input value and coordinates showing the positions of a plurality of feature points in the teacher image relating to the reference indication are output values. As described above, the machine learning model generated here outputs, with respect to the input of the image, feature areas based on the standard deviations of estimated coordinates in addition to the estimated coordinates showing the positions of the plurality of feature points in the image relating to the reference indication added to the fastening part. Here, the teacher data used here includes teacher data including the teacher image generated by the data expansion in step S103. However, the used teacher data is not limited to the teacher data relating to the teacher image generated in step S103. The teacher data may include teacher data based on a teacher image obtained by actually capturing an image of the fastening part, a sample image, and/or a data set expanded by other means. After that, the processing shown in this flowchart ends.

According to the data expansion processing and the machine learning processing described above, it is possible to ensure teacher data having ensured quality and rich in variation regardless of a teacher image obtained by capturing an image of an actual fastening part or the amount of a sample image and increase the accuracy of a machine learning model.

Figure 8:
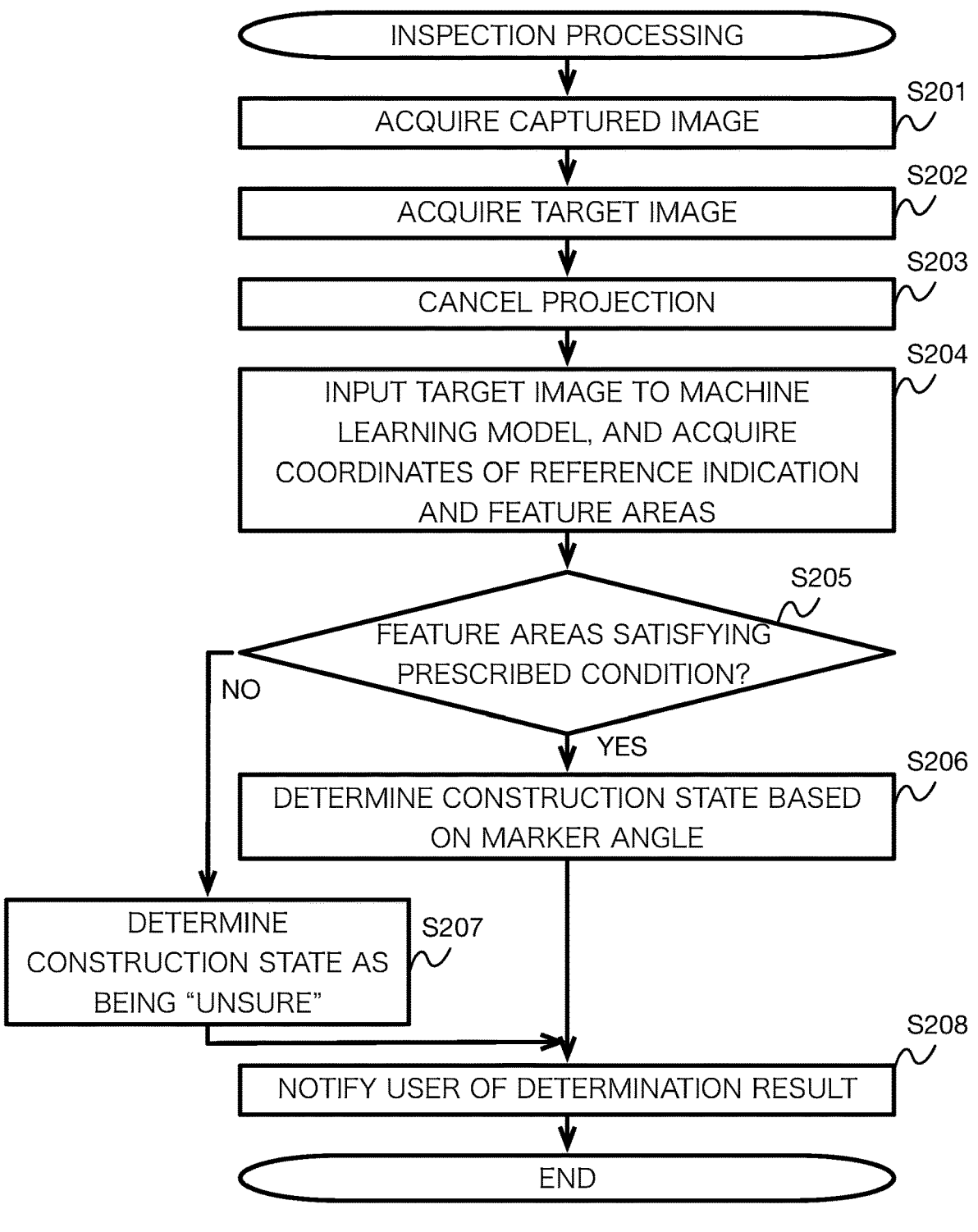
FIG. 8 is a flowchart showing the flow of inspection processing according to the embodiment.

FIG. 8 is a flowchart showing the flow of inspection processing according to the present embodiment. The processing shown in this flowchart is performed upon the input of a captured image or the input of instructions to perform the inspection processing by an operator in the inspection step (step S6) of the fastening procedure or in inspection periodically (for example, every year) performed after fastening.

In step S201, a captured image is acquired. An operator captures an image of a fastening part using the imaging device 81, and inputs image data on the obtained captured image to the information processing device 1. At this time, the operator may perform photographing so that a plurality of fastening parts are included in one captured image. When a plurality of fastening parts are included in one captured image, the inspection processing is performed for each of the fastening parts included in the captured image. An imaging method and a method for inputting image data to the information processing device 1 are not limited. However, in the present embodiment, an image of a plurality of fastening parts fastened to a structure is captured using the drone 8 with the imaging device 81, and image data transferred from the imaging device 81 to the user terminal 9 via communication or a recording medium is further transferred to the information processing device 1 via a network. As a result, image data on the captured image is input to the information processing device 1. When the captured image is acquired by the captured image acquisition unit 25, the processing proceeds to step S202.

In steps S202 and S203, a target image is detected, and projection is canceled where necessary. The target image acquisition unit 26 detects a target image from the captured image (step S202), and the projection cancelation unit 27 cancels projection applied when the target image was captured (step S203). Note that some or all of the processing of step S202 may be omitted when the target image included in the captured image is less distorted as described above, and may be appropriately omitted according to the embodiment. After that, the processing proceeds to step S204.

In steps S204 to S207, fastening states are determined. The feature area detection unit 28 acquires, by inputting the target image obtained in step S203 to a machine learning model, feature areas that include feature points in the target image relating to reference indication added to the fastening parts and are based on the estimated coordinates of the feature points and the standard deviations of the estimated coordinates (step S204). The uncertainty evaluation unit 29 determines whether the feature areas (elliptic areas) defined by the standard deviations of the estimated coordinates obtained in step S204 satisfy a prescribed reference (step S205). When the feature areas satisfy the prescribed reference (YES in step S205), the fastening state determination unit 30 determines the fastening states of the fastening parts based on the estimated coordinates of the reference indication (step S206). On the other hand, when the feature areas do not satisfy the prescribed reference (NO in step S205), the fastening state determination unit 30 determines the fastening states of the fastening parts as being "unsure" (step S207). After that, the processing proceeds to step S208.

In step S208, the user is notified of the determination result of the fastening states. The notification unit 31 notifies the user of the determination result in step S205 and/or the determination result in step S206. After that, the processing shown in this flow chart ends.

Effects

According to the information processing device, the information processing method, and the information processing program according to the present embodiment, the provision of the above configuration makes it possible to consider a difficulty in determining the position of reference indication and increase the efficiency of learning data set construction that possibly causes an obstacle to perform specification using a machine learning model.

Variation

In the above embodiment, the projection applied when the target image was captured is canceled before the processing by the feature area detection unit 28. However, a timing at which the cancelation of projection is performed is not limited to the time before the processing by the feature area detection unit 28. Note that this variation will omit the descriptions of configurations common to the above embodiment and describe differences.

Figure 9:
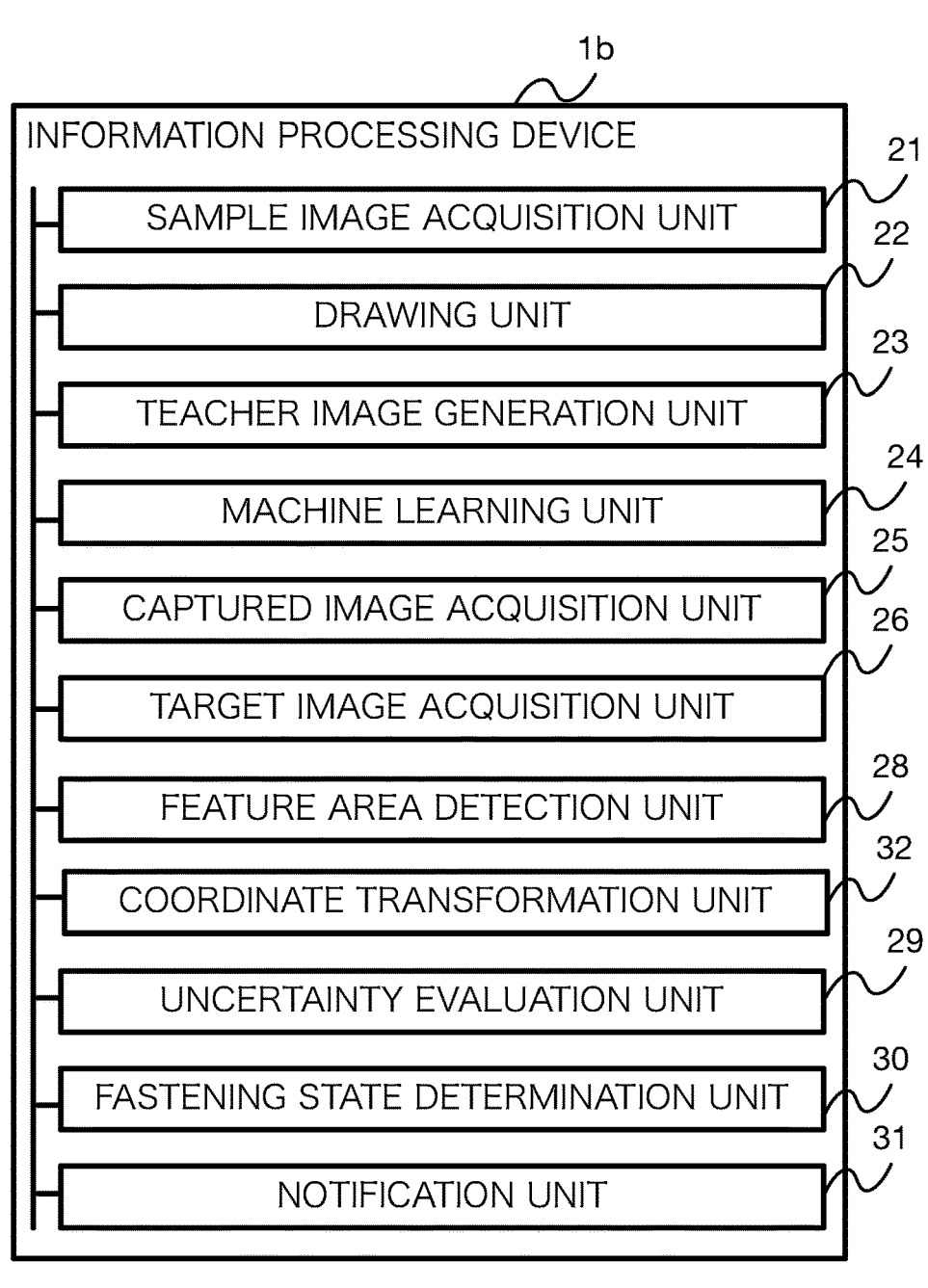
FIG. 9 is a diagram showing the outline of the function configuration of an information processing device according to a variation.

FIG. 9 is a diagram showing the outline of the function configuration of an information processing device 1b according to the variation. When a program recorded on a storage device 14 is read by a RAM 13 and performed by a CPU 11 and respective hardware provided in the information processing device 1b is controlled, the information processing device 1b functions as an information processing device including a sample image acquisition unit 21, a drawing unit 22, a teacher image generation unit 23, a machine learning unit 24, a captured image acquisition unit 25, a target image acquisition unit 26, a feature area detection unit 28, a coordinate transformation unit 32, an uncertainty evaluation unit 29, a fastening state determination unit 30, and a notification unit 31. That is, in the present embodiment, the coordinate transformation unit 32 is employed instead of a projection cancelation unit 27.

The coordinate transformation unit 32 transforms, before processing by the fastening state determination unit 30, the coordinates of a plurality of feature points detected by the feature area detection unit 28 so that projection applied when a target image was captured is canceled. A specific method for canceling the projection is the same as that performed by the coordinate transformation unit 32 described above except that the whole image is not deformed but information on the coordinates of feature points is transformed, and therefore its description will be omitted.

Figure 10:
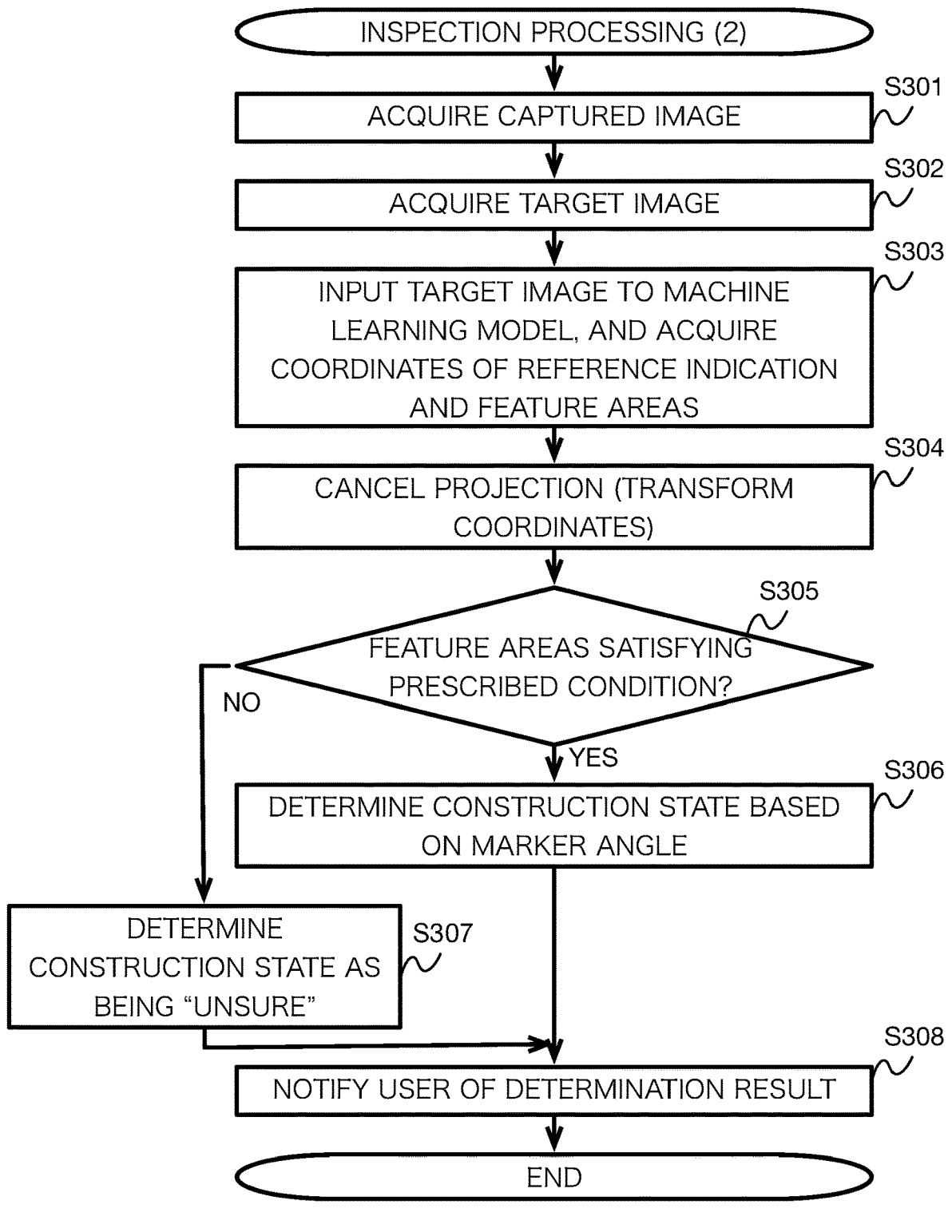
FIG. 10 is a flowchart showing the flow of inspection processing according to the variation.

FIG. 10 is a flowchart showing the flow of inspection processing according to the variation. Like the inspection processing described with reference to FIG. 8, the processing shown in this flowchart is performed upon the input of a captured image or the input of instructions to perform the inspection processing by an operator in the inspection step (step S6) of the fastening procedure or in inspection periodically (for example, every year) performed after fastening.

The processing of steps S301 and S302 is substantially the same as that of steps S201 and S202 in the inspection processing described with reference to FIG. 8, and therefore its description will be omitted. Note that processing to cancel projection corresponding to step S203 will be omitted in this variation. After that, the processing proceeds to step S303.

In steps S303 to S308, fastening states are determined, and a user is notified of a determination result. The feature area detection unit 28 acquires, by inputting a target image obtained in step S302 to a machine learning model, feature areas that include feature points in the target image relating to reference indication added to fastening parts and are based on estimated coordinates showing the positions of the feature points and the standard deviations of the estimated coordinates (step S303). Then, the coordinate transformation unit 32 transforms the coordinates of the plurality of feature points detected in step S303 so that projection applied when the target image was captured is canceled (step S304).

The uncertainty evaluation unit 29 determines whether the feature areas (elliptic areas) defined by the standard deviations of the coordinates obtained in step S304 satisfy a prescribed reference (step S305). When the feature areas satisfy the prescribed reference (YES in step S305), the fastening state determination unit 30 determines the fastening states of the fastening parts based on the estimated coordinates of the reference indication (the coordinates obtained in step S304 in this variation) (step S306). On the other hand, when the feature areas do not satisfy the prescribed reference (NO in step S305), the fastening state determination unit 30 determines the fastening states of the fastening parts as being "unsure" (step S307). The notification unit 31 notifies the user of the determination result in step S305 and/or the determination result in step S306 (step S308). After that, the processing shown in this flow chart ends.

Other Variations

The above embodiment describes the example in which the data expansion processing, the machine learning processing, and the inspection processing for fastening states are performed in the same information processing device. However, each of the data expansion processing, the machine learning processing, and the inspection processing for fastening states may be performed in a different information processing device. Therefore, as for the function configurations of the information processing devices described with reference to FIGS. 5 and 9, unnecessary function units may be removed depending on which of the data expansion processing, the machine learning processing, and the inspection processing for fastening states is performed in the information processing devices.

Further, the above embodiment describes the method in which the marker line 4 written by the operator is used as the reference indication. However, other indication may be used as the reference indication. For example, a protrusion, a notch, print, or the like added in advance to the fastening material 7 such as the bolt 71, the nut 72, and the washer 73 may be used as the reference indication. As the fastening material 7 having such reference indication, a fastening material 7 that has asymmetrical appearance due to its partially-provided protrusion or the like and makes it possible to determine its rotation state according to an image has been conventionally known (for example, a smart bolt).

Further, the inverse transformation of a captured image may be processed using a method different from that of the above embodiment. For example, a method for inversely transforming a captured image by ellipse fitting in which all or a part of a circular arc that is a perfect circle in a plan view but is an ellipse in a captured image when projected is extracted from the captured image and transformed into a perfect circle may be employed. Here, examples of a circular arc that is a perfect circle in a plan view but is an ellipse in a captured image include the edge of the fastening material 7 (such as the bolt 71, the nut 72, and the washer 73) or the like.

The gravity center of a fastening part on the plane (hereinafter "target plane") of the fastened target 6 may be estimated from the center of the fastening material 7 such as the center of the screw threads of the bolt 71 and the center of the nut 72 specified from a captured image. However, the center of the fastening material 7 is not positioned on the target plane. Therefore, attention has to be paid to the fact that different projection is applied to the fastening material 7. For example, the projection cancelation unit 27 or the coordinate transformation unit 32 estimates the center of the fastening material 7 by performing ellipse fitting based on the shape of the fastening material 7 such as the screw threads of the bolt 71 and the nut 72, and estimates the gravity center of the fastening part on the target plane based on the distance between the estimated center of the fastening material 7 and the target plane. At this time, the distance between the center of the fastening material 7 and the target plane becomes substantially the same according to the standard of the fastening material 7 and the shape of the fastened target 6, and therefore may be held in advance.

What is claimed is:

1. An information processing device comprising:

at least one memory configured to store program code; and at least one processor coupled to the memory, the at least one processor being configured to access the at least one memory and operate as instructed by the program code, the program code including:

acquiring code configured to cause at least one of the at least one processor to acquire, by inputting a target image showing a fastening part that is an inspected target to a machine learning model, a feature area including a feature point relating to reference indication added to the fastening part, the feature area being based on an estimated coordinate relating to a position of the feature point and a distribution of the estimated coordinate; and determining code configured to:

cause at least one of the at least one processor to determine whether the feature area satisfies a prescribed reference, and determine a fastening state of the fastening part based on the estimated coordinate when the feature area satisfies the prescribed reference.

2. The information processing device according to claim 1, wherein the fastening part has a fastening material and a fastened target that are screw-fastened, the reference indication is one that is added to the fastening material and the fastened target after primary fastening, and that shows a change in a positional relationship between the reference indication on the fastening material and the reference indication on the fastened target when the secondary fastening is performed, and the program code is configured to cause at least one of the at least one processor to determine the fastening state of the fastening part based on the estimated coordinate of the feature point relating to each of the reference indication on the fastening material and the reference indication on the fastened target that show the change in positional relationship when the secondary fastening is performed.

3. The information processing device according to claim 2, wherein the feature point includes a feature point relating to each of a fastening shaft in the fastening part, the reference indication on the fastening material, and the reference indication on the fastened target.

4. The information processing device according to claim 2, wherein the fastening material has a bolt and a nut, and the feature point includes a feature point showing each of a fastening shaft in the fastening part, a position of the reference indication at an outer edge of a tip end of the bolt, a position of the reference indication at an inner edge of a surface of the nut, a position of the reference indication at an outer edge of the surface of the nut, and a position of the reference indication on the fastened target.

5. The information processing device according to claim 4, wherein the program code is further configured to cause at least one of the at least one processor to determine that the fastening part is properly fastened when an angle formed by a first approximate straight line passing through the fastening shaft in the fastening part, the position of the reference indication at the outer edge of the tip end of the bolt, and the position of the reference indication on the fastened target and a second approximate straight line passing through the fastening shaft in the fastening part, the position of the reference indication at the inner edge of the surface of the nut, and the position of the reference indication at the outer edge of the surface of the nut falls within a prescribed range.

6. The information processing device according to claim 1, wherein the estimated coordinate is a two-dimensional coordinate, and the distribution of the estimated coordinate is a standard deviation for each of two axes constituting the two-dimensional coordinate.

7. The information processing device according to claim 1, wherein the program code is further configured to cause at least one of the at least one processor to determine the fastening state of the fastening part as being unsure when the feature area does not satisfy the prescribed reference.

8. The information processing device according to claim 1, wherein the program code is further configured to cause at least one of the at least one processor to:

generate the machine learning model using teacher data in which a teacher image obtained by capturing an image of a screw-fastened fastening part is an input value and a coordinate showing a position of a feature point in the teacher image relating to reference indication added to the fastening part is an output value.

9. The information processing device according to claim 1, wherein the program code is further configured to cause at least one of the at least one processor to:

notify a user of a result determined by the at least one processor and/or a result determined by the at least one processor.

10. The information processing device according to claim 1, wherein the program code is further configured to cause at least one of the at least one processor to:

acquire a captured image as an inspected target; and acquire the target image by specifying a portion in which an image of the fastening part in the captured image is captured and cutting out the portion in which the image of the fastening part is captured from the captured image.

11. The information processing device according to claim 1, wherein the program code is further configured to cause at least one of the at least one processor to:

perform, before processing by the at least one processor, image transformation to cancel projection applied when the target image is captured.

12. The information processing device according to claim 1, wherein the program code is further configured to cause at least one of the at least one processor to:

transform, before processing by the at least one processor, a coordinate of the feature point detected by the at least one processor so that projection applied when the target image is captured is canceled.

13. The information processing device according to claim 1, wherein a size of the feature area is specified by the distribution of the estimated coordinate, wherein the prescribed reference is a prescribed reference with respect to the size of the feature area, and wherein the program code is further configured to cause at least one of the at least one processor to determine the fastening state of the fastening part using the estimated coordinate only when it is determined that the feature area satisfies the prescribed reference.

14. An information processing method in which a computer performs:

acquiring, by inputting a target image showing a fastening part that is an inspected target to a machine learning model, a feature area including a feature point relating to reference indication added to the fastening part, the feature area being based on an estimated coordinate relating to a position of the feature point and a distribution of the estimated coordinate;

determining whether the feature area satisfies a prescribed reference; and determining a fastening state of the fastening part based on the estimated coordinate when the feature area satisfies the prescribed reference.

15. A non-transitory computer-readable recording medium having recorded thereon an information processing program configured to cause a computer to execute:

acquiring, by inputting a target image showing a fastening part that is an inspected target to a machine learning model, a feature area including a feature point relating to reference indication added to the fastening part, the feature area being based on an estimated coordinate relating to a position of the feature point and a distribution of the estimated coordinate;

determining whether the feature area satisfies a prescribed reference; and determining a fastening state of the fastening part based on the estimated coordinate when the feature area satisfies the prescribed reference.

* * * * *